United States Patent [19]

Valyocsik

[11] Patent Number: 4,481,177
[45] Date of Patent: Nov. 6, 1984

[54] SYNTHESIS OF ZEOLITE ZSM-22 WITH A HETEROCYCLIC ORGANIC COMPOUND

[75] Inventor: Ernest W. Valyocsik, Yardley, Pa.

[73] Assignee: Mobil Oil Corporation, New York, N.Y.

[21] Appl. No.: 448,133

[22] Filed: Dec. 9, 1982

[51] Int. Cl.$^3$ .......................................... C01B 33/28
[52] U.S. Cl. ........................... 423/329; 423/328; 423/330; 423/331; 423/332; 502/77
[58] Field of Search ............. 423/328, 329, 330, 331, 423/332; 502/77

[56] References Cited

U.S. PATENT DOCUMENTS

| | | | |
|---|---|---|---|
| 4,061,717 | 12/1977 | Kerr et al. | 423/329 |
| 4,372,930 | 2/1983 | Short et al. | 423/328 |
| 4,388,285 | 6/1983 | Rankel et al. | 423/329 |
| 4,391,785 | 7/1983 | Rosinski et al. | 423/329 |
| 4,397,825 | 8/1983 | Whittam | 423/328 |
| 4,414,189 | 11/1983 | Kokotailo et al. | 423/328 |

FOREIGN PATENT DOCUMENTS

| | | |
|---|---|---|
| 0055045 | 6/1982 | European Pat. Off. |
| 0057049 | 8/1982 | European Pat. Off. |
| 0077624 | 4/1983 | European Pat. Off. |
| 0140023 | 11/1981 | Japan .................................. 423/328 |
| 0007816 | 1/1982 | Japan .............................. 252/455 Z |

OTHER PUBLICATIONS

Parker et al., "Synthesis and Some Properties of Two Novel Zeolites, KZ-1 and KZ-2" *Zeolites* vol. 3, pp. 8-11, 1983.

L. B. Young, U.S. application Ser. No. 373,453, filed Apr. 30, 1982.

E. W. Valyocsik, U.S. application Ser. No. 373,452, filed Apr. 30, 1982.

F. G. Dwyer, U.S. application Ser. No. 373,451, filed Apr. 30, 1982.

Olson et al., U.S. application Ser. No. 413,958, filed Aug. 1, 1982.

*Primary Examiner*—John Doll
*Assistant Examiner*—Jackson Leeds
*Attorney, Agent, or Firm*—A. J. McKillop; M. G. Gilman; E. F. Kenehan, Jr.

[57] ABSTRACT

An improved process for preparing ZSM-22 zeolite is disclosed and claimed. The process comprises preparing a reaction mixture comprised of sources of an alkali or alkaline earth metal, alumina, silica, organic promoter and water, and having the following composition, in terms of mole ratios of oxides:

$SiO_2/Al_2O_3 = 20$ to $\infty$
$H_2O/SiO_2 = 10$ to $100$
$OH^-/SiO_2 = 0$ to $1.0$
$M^+/SiO_2 = 0$ to $2.0$
$RN/SiO_2 = 0.01$ to $2.0$ wherein RN is a functional group of a heterocyclic organic compound containing one or more four (4) to ten (10) member, saturated or unsaturated, non-fused rings, wherein the hetero atoms are the same or different, and they are oxygen, phosphorus or nitrogen, an alkyl and/or alkene derivative of the heterocyclic organic compound, wherein the alkyl and/or alkene groups contain one (1) to ten (10) carbon atoms, or an organic or inorganic salt of the heterocyclic organic compound or its alkyl or alkene derivative, and M is an alkali or alkaline earth metal, e.g., Na, K, Cs, Li, Ca or Sr, and maintaining the reaction mixture at crystallization conditions until crystals of the ZSM-22 zeolite are formed.

18 Claims, No Drawings

SYNTHESIS OF ZEOLITE ZSM-22 WITH A HETEROCYCLIC ORGANIC COMPOUND

BACKGROUND OF THE INVENTION

1. Field of the Invention

This invention relates to an improved method of synthesizing a porous crystalline material designated Zeolite ZSM-22.

2. Description of Related Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure, as determined by X-ray diffraction pattern, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as having a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed by the relationship of aluminum to the cations, wherein the ratio of aluminum to the number of various cations, such as Ca/2, Sr/2, Na, K, Cs or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. The aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-22 (U.S. patent applications Ser. Nos. 373,451 and 373,452, both filed on Apr. 30, 1982), zeolite ZSM-23 (U.S. Pat. No. 4,076,842), ZSM-35 (U.S. Pat. No. 4,016,245), and ZSM-38 (U.S. Pat. No. 4,046,859).

The $SiO_2/Al_2O_3$ ratio of a given zeolite is often variable. For example, zeolite X can be synthesized with $SiO_2/Al_2O_3$ mole ratios of from 2 to 3; zeolite Y, from 3 to about 6. In some zeolites, the upper limit of the $SiO_2/Al_2O_3$ ratio is unbounded. ZSM-5 is one example of such zeolite wherein the $SiO_2/Al_2O_3$ ratio is at least 5, up to infinity. U.S. Pat. No. 3,941,871, now Re. 29,948, the entire contents of which are incorporated herein by reference, discloses a porous crystalline silicate zeolite made from a reaction mixture containing no deliberately added alumina in the recipe and exhibiting the X-ray diffraction pattern characteristic of ZSM-5 type zeolites. U.S. Pat. Nos. 4,061,724, 4,073,865 and 4,104,294, the entire contents of all three patents being incorporated herein by reference, describe crystalline silcates or organosilicates of varying alumina and metal content.

Zeolite ZSM-22 has heretofore been synthesized with an organic compound (also known in the art as an organic promoter) expressed by the formula:

$R_4J^+$ wherein J is an element of Group VB of the Periodic Chart of the Elements, e.g., N or P, preferably N, and each R is an alkyl or aryl group having at least two carbon atoms or hydrogen. Suitable organic compounds were dialkylammonium compounds wherein each of the alkyl groups was the same or different, with each alkyl group having two (2) to eight (8) carbon atoms (see, e.g., the aforementioned U.S. patent application Ser. No. 373,451, filed on Apr. 30, 1982). When alkane diamines were used as the organic compounds, it was preferred to use larger alkali metal cations, e.g., potassium ($K^+$) or cesium ($Cs^+$), at the $SiO_2/Al_2O_3$ mole ratios of about 20 to about 90 to obtain ZSM-22 crystals substantially free of impurities or other crystals (see e.g., the aforementioned U.S. patent application Ser. No. 373,452, filed on Apr. 30, 1982). The use of the potassium cation may be disadvantageous in some applications because potassium is more difficult to remove than sodium from the synthesized zeolite by ammonium ion ($NH_4^+$) exchange. As is known in the art, the presence of alkali or alkaline earth cations in zeolites lowers catalytic activity thereof.

SUMMARY OF THE INVENTION

It has now been found that ZSM-22 zeolite can be synthesized at a relatively wide range of $SiO_2/Al_2O_3$ mole ratios of about 20 to infinity ($\infty$) in the presence of a heterocyclic organic compound (or an organic promoter) containing one or more four (4) to ten (10) member, saturated or unsaturated, non-fused rings, wherein the hetero atoms are the same or different, and they are oxygen (O), phosphorous (P) or nitrogen (N), an alkyl and/or alkene derivative of the heterocyclic organic compound, wherein the alkyl and/or alkene groups contain from one (1) to ten (10) carbon atoms or an organic or inorganic salt of the heterocyclic organic compound or its alkyl or alkene derivative. In the preferred embodiment, the heterocyclic organic compound has five (5) to eight (8) member ring or rings, the hetero atoms are nitrogen or oxygen, and the hetero atoms are the same or different, the alkyl or alkene chains of the alkyl or alkene derivatives, respectively, have one (1) to four (4) carbon atoms, and the organic or inorganic salts of the heterocyclic compound, their alkyl or alkene derivatives, can be used. In the most preferred embodiment, the heterocyclic organic compound has one six (6) member ring, containing one nitrogen as the hetero atom, the alkyl or alkene chains of the alkyl or alkene derivatives, respectively, have one (1) to three (3) carbon atoms, and/or the organic or inorganic salts of the heterocyclic compound, their alkyl or alkene derivatives, can be used, with the halogenated alkyl derivatives, e.g., N-alkylpyridine halides, such as N-ethylpyridinium bromide, being preferred.

In addition to the heterocyclic organic compound, the reaction mixture also contains a source of silica, an alkali metal oxide or an alkaline earth metal oxide, e.g., sodium, potassium, cesium, calcium or strontium, water, and alumina, and has a consumption, in terms of mole ratios of oxides, falling within the following ratios:

| Reactants | | Broad | Preferred |
|---|---|---|---|
| $SiO_2/Al_2O_3$ | = | 20 to ∞ | 30 to 1000 |
| $H_2O/SiO_2$ | = | 10 to 100 | 20 to 60 |
| $OH^-/SiO_2$ | = | 0 to 1.0 | 0.1 to 0.4 |
| $M^+/SiO_2$ | = | 0 to 2.0 | 0.1 to 1.0 |
| $RN/SiO_2$ | = | 0.01 to 2.0 | 0.05 to 1.0 | wherein RN is a functional group of a heterocyclic organic compound, and M is an alkali metal or an alkaline earth metal. The mixture is maintained at a crystallization temperature unit crystals of the ZSM-22 zeolite are formed. Thereafter, the crystals are separated from the liquid by any conventional means, washed and recovered. The ZSM-22 zeolite can be used in aromatics alkylation reactions (e.g., toluene alkylation by methanol and ethylene), toluene disproportionation, selective cracking of a meta/para-cymene mixture, and conversion of various oxygenates to gasoline-grade hydrocarbons.

DETAILED DESCRIPTION OF THE INVENTION

Crystallization can be carried out at either static or stirred conditions in a reactor vessel, e.g., a polypropylene jar, teflon lined or stainless steel autoclaves, at 80° C. (176° F.) to about 210° C. (410° F. ) for about 6 hours to 150 days. Thereafter, the crystals are separated from the liquid and recovered. The composition can be prepared utilizing materials which supply the appropriate oxide. Such materials include aluminates, alumina, silicates, sodium silicate, silica hydrosol, silica gel, silicic acid, sodium, potassium or cesium hydroxide, and a heterocyclic organic compound. Suitable heterocyclic organic compounds are, pyrrole and its derivatives, furan and its derivatives, imidazole and its derivatives, oxazole and its derivatives, pyrazole and its derivatives, pyrroline and its derivatives, pyrrolidone and its derivatives, pyridine, its alkyl cations, and its derivatives, e.g., N-methylpyridinium halide, N-ethylpyridinium halide, such as N-ethylpyridinium fluoride, chloride, bromide or iodide, pyrazine and its derivatives, e.g., N-methylpyrazinium halide, pyrimidine and its derivatives, e.g., N-methypyrimidinium halide, morpholine and its derivatives, e.g., N-methyl-, N-ethyl-, N-propyl-, N-butyl-, N-pentyl, N-ethylene-, N-propylene-, N-1-butene-, N-2-butene-, N-iso-butene-, N-1pentenemorpholines, N-dialkylmorpholinium halides, such as N-dimethylmorpholinium bromide, N-alkyl-N-alkene morpholinium halides, such as N-methyl-N-ethylenemorpholinium bromide, cyclophosphazane and its derivatives, of the formula:

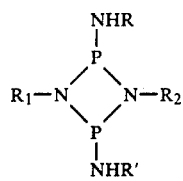

wherein R, R', $R_1$ and $R_2$ are the same or different and can be hydrogen, alkyl or alkene or halogenated alkane or alkene, and bis-cyclic compounds, or their derivatives, wherein the heterocyclic rings are connected by an alkene, of the general formula

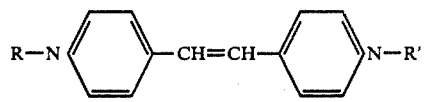

wherein R and R' are the same or different and can be hydrogen, alkane, alkene, or halogenated alkane or alkene, e.g., dimethyl-trans-1,2-bis (4-pyridyl)ethylinium bromide.

The reaction mixture can be prepared either batchwise or continuously. Crystal size and crystallization time of the ZSM-22 crystalline material vary with the nature of the reaction mixture employed and the crystallization conditions.

As set forth above, the ZSM-22 zeolite can be prepared at a relatively wide range of $SiO_2/Al_2O_3$ ratios of about 20 to about infinity (∞), preferably 30 to 1000. Any alkali or alkaline earth metal cations can be used within the entire range of $SiO_2/Al_2O_3$ mole ratios. However, because smaller cations, e.g. $Na^+$ cation, are relatively easily removed by cation exchange (e.g., with ammonium) from the synthesized zeolite, it is preferred to use such smaller alkali or alkaline earth cations.

The highly siliceous ZSM-22 zeolite comprises crystalline, three-dimensional continuous framework silicon-containing structures or crystals which result when all the oxygen atoms in the tetrahedra are mutually shared between tetrahedral atoms of silicon or aluminum, and which can exist with a network of mostly $SiO_2$, i.e., exclusive of any intracrystalline cations. Similar crystals form building blocks of materials, such as quartz, cristobalite and a long list of zeolite structures, such as ZSM-5, ZSM-11, ZSM-12, ZSM-23, ZSM-35, ZSM-38, ZSM-48 (described in European Patent Application No. 80,300,463 published Sept. 3, 1980 as Publication No. 0,015,132, the entire content of which is incorporated herein by reference), mordenite and perhaps even faujasite. Not all zeolite structures are known to exist at this time in predominantly $SiO_2$ - containing compositions - so the above class of materials does not presently include some zeolites, such as zeolite A.

In the as-synthesized form, the ZSM-22 has a calculated composition, in terms of moles of oxides, after dehydration, per 100 moles of silica, as follows:

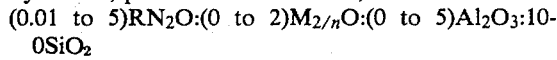

wherein RN is a functional group of a heterocyclic organic compound and M is an alkali metal or an alkaline earth metal having a valence n, e.g., Na, K, Cs, Li, Ca or Sr.

ZSM-22 can further be identified by its sorptive characteristics and its X-ray diffraction pattern. The original cations of the as-synthesized ZSM-22 may be replaced at least in part by other ions using conventional ion exchange techniques. It may be necessary to precalcine the ZSM-22 zeolite crystals prior to ion exchange. The replacing ions introduced to replace the original alkali, alkaline earth and/or organic cations may be any that are desired, so long as they can pass through the channels within the zeolite crystals. Desired replacing ions are those of hydrogen, rare earth metals, metals of Groups IB, IIA, IIB, IIIA, IVA, IVB, VIB, and VIII of the Periodic Table. Among the metals, those particularly preferred are rare earth metals, manganese, zinc and those of Group VIII of the Periodic Table.

ZSM-22 zeolite described herein has a definite X-ray diffraction pattern, set forth below in Table I, which distinguishes it from other crystalline materials.

TABLE I

Most Significant Lines of ZSM-22

| Interplanar d-spacings (Å) | Relative Intensity |
| --- | --- |
| 10.9 ± 0.2 | M-VS |
| 8.7 ± 0.16 | W |
| 6.94 ± 0.10 | W-M |
| 5.40 ± 0.08 | W |
| 4.58 ± 0.07 | W |
| 4.36 ± 0.07 | VS |
| 3.68 ± 0.05 | VS |
| 3.62 ± 0.05 | S-VS |
| 3.47 ± 0.04 | M-S |
| 3.30 ± 0.04 | W |
| 2.74 ± 0.02 | W |
| 2.52 ± 0.02 | W |

These values were determined by standard techniques. The radiation was the K-alpha doublet of copper, and a diffractometer equipped with a scintillation counter and an associated computer were used. The peak heights, I, and the positions as a function of 2 theta, where theta is the Bragg angle, were determined using algorithms on the computer associated with the spectrometer. From these, the relative intensities, 100 $I/I_o$, where $I_o$ is the intensity of the strongest line or peak, and d (obs.) the interplanar spacing in angstroms (A), corresponding to the recorded lines, were determined. In Table I, the relative intensities are given in terms of the symbols vs=very strong, s=strong, m=medium, w=weak, etc. It should be understood that this X-ray diffraction pattern is characteristic of all the species of ZSM-22 zeolite compositions. Ion exchange of the alkali or alkaline earth metal cations with other ions results in a zeolite which reveals substantially the same X-ray diffraction pattern as that of Table I with some minor shifts in interplanar spacing and variations in relative intensity. Other minor variations can occur, depending on the silica to alumina ratio of the particular sample, as well as its degree of thermal treatment.

The ZSM-22 zeolite freely sorbs normal hexane and has a pore dimension greater than about 4 Angstroms. In addition, the structure of the zeolite must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering or pore blockage may render these zeolites ineffective. Twelve-membered rings do not generally appear to offer sufficient constraint to produce the advantageous hydrocarbon conversions, although puckered structures exist such as TMA ofretite which is a known effective zeolite. Also, such twelve-membered structures can be conceived that may be operative due to pore blockage or other causes.

Rather than attempt to judge from crystal structure whether or not a zeolite possesses the necessary constrained access, a simple determination of the "constraint index" may be made by passing continuously a mixture of an equal weight of normal hexane and 3-methylpentane over a sample of zeolite at atmospheric pressure according to the following procedure. A sample of the zeolite, in the form of pellets or extrudates, is crushed to a particle size about that of coarse sand and mounted in a glass tube. Prior to testing, the zeolite is treated with a stream of air at 1000° F. for at least 15 minutes. The zeolite is then flushed with helium and the temperature adjusted between 550° F. (288° C.) and 950° F. (510° C.) to give an overall conversion between 10% and 60%. The mixture of hydrocarbons is passed at a 1 liquid hourly space velocity (LHSV), i.e., 1 volume of liquid hydrocarbon per volume of zeolite per hour, over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. The ZSM-22 zeolite has a constraint index of about 2.6 at 800° F. (427° C). Constraint Index (CI) values for some other typical zeolites are:

| Zeolite | C.I. |
| --- | --- |
| ZSM-5 | 8.3 |
| ZSM-11 | 8.7 |
| ZSM-12 | 2 |
| ZSM-23 | 9.1 |
| ZSM-38 | 2 |
| ZSM-35 | 4.5 |
| Clinoptilolite | 3.4 |
| TMA Offretite | 3.7 |
| Beta | 0.6 |
| ZSM-4 | 0.5 |
| H—Zeolon | 0.4 |
| REY | 0.4 |
| Amorphous Silica-Alumina (non-zeolite) | 0.6 |
| Erionite | 38 |

It is to be realized that the above constraint index values typically characterize the specified zeolites but that these are the cumulative result of several variables used in determination and calculation thereof. Thus, for a given zeolite depending on the temperature employed within the aforenoted range of 550° F. to 950° F., with accompanying conversion between 10% and 60%, the constraint index may vary within the indicated approximate range of 1 to 12. Likewise, other variables such as the crystal size of the zeolite, the presence of possible occluded contaminants and binders intimately combined with the zeolite, may affect the constraint index. It will accordingly be understood by those skilled in the art that the constraint index, as utilized herein, while affording a highly useful means for chacterizing the zeolites of interest is an approximation, taking into consideration the manner of its determination, with probability, in some instances, of compounding variable extremes.

While the above experimental procedure will enable one to achieve the desired overall conversion of 10 to 60% for most catalyst samples and represents preferred conditions, it may occasionally be necessary to use somewhat more severe conditions for samples of very low activity, such as those having a very high silica to alumina mole ratio. In those instances, a temperature of up to about 1000° F. and a liquid hourly space velocity of less than one, such as 0.1 or less, can be employed in order to achieve a minimum total conversion of about 10%.

Preliminary data indicates that the ZSM-22 zeolite has an orthorhombic noncentral structure consisting substantially of 5 and 6-member rings which form a substantially unidirectional 10-ring channel system. Four member rings appear to be completely absent from the structure, which may explain, at least to some extent, the relatively high thermal stability of ZSM-22. (A sample of ZSM-22 was found to be thermally stable after heating at 550° C. in air for 20 hours, and substantially steam stable, after the treatment at 920° F. - about 493° C. - for 5 hours in 1 atm saturated steam.) The ZSM-22 crystalline structure appears to be similar to zeolites of the ZSM-5 family, particularly ZSM-5, ZSM-11, ZSM-23, and ZSM-35. Accordingly, its performance characteristic may be similar to those of the aforementioned zeolites of the ZSM-5 family. Preliminary data, however, does not completely support this hypothesis. For example, the $\alpha$ activity, set forth in Table II, of ZSM-22 samples is less than that predicted for the ZSM-5 zeolite of equivalent $SiO_2/AL_2O_3$ mole ratios. Without wishing to be bound by any theory of operability, it is possible that trace amounts of the potassium cation ($K^+$) strategically located within the unidimensional channels may account for the reduced activity of the zeolite. Extractions of ZSM-22 samples with hydrochloric acid (HCl) to reduce the $K^+$ level in the zeolite may be effective in improving activity.

TABLE II

Comparison of Activities for ZSM-22 and ZSM-5

| Form | Wt % K Present | $\alpha$-value Observed | (expected) |
|---|---|---|---|
| As-synthesized | 2.3 | — | (—) |
| TMA-exchanged[a] | 0.41 | 35 | ($\alpha$ = 130)[c] |
| NH$_4$—exchanged[b] | 0.04 | 61 | ($\alpha$ = 130)[c] |

[a] 98° C. stirred 6 hrs. in 0.5 N tetramethyl ammonium bromide (TMABr).
[b] 98° C. stirred 6 hrs. in 1.0 N NH$_4$NO$_3$.
[c] $\alpha$-value expected for ZSM-5 of equivalent SiO$_2$/Al$_2$O$_3$ ratio.

The alpha-test ($\alpha$-test) is an indication of the relative catalytic cracking activity of the catalyst compared to a standard catalyst. The value of $\alpha$ is the relative rate constant (rate of n-hexane conversion per unit volume of catalyst per unit time). It is based on the activity of highly active silica-alumina cracking catalyst taken as $\alpha = 1$.

The $\alpha$-test is further described in a letter to the editor, entitled "Superactive Crystalline Alumino-Silicate Hydrocarbon Cracking Catalysts", by P. B. Weisz and J. N. Miale, *Journal of Catalysis, Vol.* 4, pp. 527–529 (Aug. 1965) and in U.S. Pat. No. 3,354,078, the entire contents of both of which are incorporated herein by reference.

The sorption of hydrocarbons by ZSM-22 has also been surveyed and the results are summarized in Table III. Sorption capacities for n-hexane (normal hexane), cylcohexane, and water are about 4% by weight, or about one third that of ZSM-5. Without wishing to be bound by any theory of operability, it is thought that the reduced sorption capacity may be due to the unidimensional channel system of ZSM-22, but residual K+ within the channels may also contribute to the relatively low sorption capacities. Cyclohexane and o-xylene sorption is relatively slow, making it difficult to determine equilibrium capacities.

TABLE III

ZSM-22 Sorption Data

| Sample | Form | Sorptions (wt %)[a] | | | | |
|---|---|---|---|---|---|---|
| | | n-hexane | 3-methyl-pentane | Cyclo-hexane[c] | H$_2$O | o-xylene[b] |
| 1 | Hydrogen (H) | 3.9 | — | 2.8 | — | — |
| 2 | H | 4.2 | 3.9 | 1.1 | — | 2 |
| 3 | H | 4.1 | — | 3.3 | 4.7 | — |
| 4 | as-synthesized | 3.4 | — | — | — | — |

[a] Hydrocarbons: pressure = 20 mm, temperature = 25° C.; water-pressure = 12 mm, temperature = 25° C.
[b] pressure = 3.7 mm, temperature = 120° C.
[c] slow tailing sorption, nonequilibrium values.

Preliminary results also indicate that ZSM-22 is para-selective in its catalytic reactions. The ZSM-22 zeolite, as synthesized, in the presence of heterocyclic organic compounds tends to crystallize as agglomerates of a rice-grain crystal morphology having the size of about 0.5 to about 2.0 microns ($\mu$). Ballmilling fractures these crystals into smaller size crystallites (about 0.1$\mu$) without significant loss of crystallinity. The zeolite can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

While synthetic ZSM-22 zeolites may be used in a wide variety of hydrocarbon conversion reactions, they are notably useful in the processes of polymerization, aromatization and cracking. Other hydrocarbon conversion processes for which ZSM-22 may be utilized in one or more of its active forms include, for example, hydrocracking and converting light aliphatics to aromatics. A process for converting light aliphatics to aromatics over a ZSM-5 type zeolite is disclosed in U.S. Pat. No. 3,760,024 the entire contents of which are incorporated herein by reference.

Employing a catalytically active form of the ZSM-22 catalyst for polymerization of olefins containing liquid or gaseous charge stocks, such charge stocks can be polymerized at temperatures between 550 and 850° F. (about 290 and 450° C.) at an hourly space velocity of between 0.5 and 50 WHSV (weight hourly space velocity) and a pressure of between 0.1 and 800 psig. In employing the catalyst of the present invention for aromiatzation of gaseous or liquid charge stocks which may be olefinic or paraffinic, with or without aromatics present, such stocks can be aromatized at temperatures of between 800° and 1200° F. (about 430° and 650° C.), pressures of 1 to 10 atmospheres and space velocities of between 0.1 and 10 weight hourly space velocity (WHSV).

Synthetic ZSM-22 zeolites can be used either in the organic nitrogen-containing and alkali metal-containing form, the alkali metal form and hydrogen form or another univalent or multivalent cationic form. The as-synthesized zeolite may be conveniently converted into the hydrogen, the univalent or multivalent cationic forms by base exchanging the zeolite to remove the sodium cations by such ions as hydrogen (from acids), ammonium, alkylammonium and arylammonium including $RNH_3$, $R_3NH^+$, $R_2NH_2^+$ and $R_4N^+$ where R is alkyl or aryl, provided that steric hindrance does not prevent thee cations from entering the cage and cavity structure of the ZSM-22 type crystalline zeolite. The hydrogen form of the zeolite, useful in such hydrocarbon conversion processes as isomerization of poly- substituted alkyl aromatics and disproportionation of alkyl aromatics, is prepared, for example, by base exchanging the sodium form with, e.g., ammonium chloride or hydroxide, whereby the ammonium ion is substituted for the sodium ion. The composition is then calcined, at a temperature of, e.g., 1000° F. (about 540° C.), causing evolution of ammonia and retention of the hydrogen proton in the composition. Other replacing cations include cations of the metals of the Periodic Table, particularly metals other than sodium, most preferably metals of Group IIA, e.g., zinc, and Groups IIIA, IVA, IB, IIB, IIIB, IVB, VIB and Group VIII of the Periodic Table, and rare earth metals and manganese.

Ion exchange of the zeolite can be accomplished conventionally, e.g., by packing the zeolite into a series of vertical fixed bed columns and successively passing through the beds a water solution of a soluble salt of the cation to be introduced into the zeolite, and then changing the flow from the first bed to a succeeding one as the zeolite in the first bed becomes ion exchanged to the desired extent. Aqueous solutions of mixtures of materials to replace the sodium can be employed. For instance, if desired, one can exchange the sodium with a solution containing a number of rare earth metals suitably in the chloride form. Thus, a rare earth chloride solution commercially available can be used to replace substantially all of the sodium in the as synthesized ZSM-22 zeolite. One such commercially available rare earth chloride solution contains chlorides of a rare earth mixture having the relative composition: cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight. Didymium chloride, which can also be used as an exchanging solution, is also a mixture of rare earth chlorides, but it has a lower cerium content. It consists of the following rare earth metals, determined as oxides: lanthanum 45-65% by weight, cerium 1-2% by weight, praseodymium 9-10% by weight, neodymium 32-33% by weight, samarium 5-7% by weight, gadolinium 3-4% by weight, yttrium 0.4% by weight, and other rare earth metals 1-2% by weight. It is to be understood that other mixtures of rare earth metals are also applicable for the preparation of the novel compositions of this invention, although lanthanum, neodymium, praseodymium, samarium and gadolinium as well as mixtures of rare earth cations containing a predominant amount of one or more of the above cations are preferred.

Base exchange with various metallic and non-metallic cations can be carried out according to the procedures described in U.S. Pat. No. 3,140,251, 3,140,252 and 3,140,253, the entire contents of which are incorporated herein by reference.

The ZSM-22 crystal can also be used as a catalyst in intimate combination with a hydrogenating component, such as tungsten, vanadium, molybdenum, rhenium, nickel, cobalt, chromium, manganese, or a noble metal, such as platinum or palladium, where a hydrogenation-dehydrogenation function is desired. Such component can be exchanged into the composition, impregnated therein or physically intimately admixed therewith. Such component can be impregnated in or onto the zeolite, for example, in the case of platinum, by treating the zeolite with a solution containing a platinum metal-containing ion. Thus, suitable platinum compounds include chloro-platinic acid, platinous chloride and various compounds containing the platinum tetrammine-platinum complex. Combinations of the aforementioned metals and methods for their introduction can also be used.

Synthetic ZSM-22 zeolite, when employed either as an absorbent or as a catalyst in a hydrocarbon conversion process, should be at least partially dehydrated. This can be accmplished by heating the zeolite to a temperature in the range of about 200° C. to about 600° C. in an inert atmosphere, such as air or nitrogen, for about 1 to about 48 hours. Simple dehydration of the crystal can also be performed at lower temperatures, such as room temperature, merely by placing the ZSM-22 zeolite type crystal in a vacuum, but a longer time is required to obtain a sufficient degree of dehydration.

In the case of many catalysts, it is desired to incorporate the new crystal with another material resistant to the temperatures and other conditions employed in organic conversion processes. Such materials include active and inactive materials and synthetic or naturally occurring zeolites as well as inorganic materials, such as clays, silica and/or metal oxides. The clays, silica and/or metal oxides may be either naturally occurring or in the form of gelatinous precipitates or gels including mixtures of silica and metal oxides. The use of such additional active material in conjunction with the new ZSM-22 crystal, i.e., combined therewith, tends to improve the conversion and/or selectivity of the catalyst in certain organic conversion processes. Inactive materials suitably serve as diluents to control the amount of conversion in a given process, so that products can be obtained economically and orderly without employing other means for controlling the rate of reaction. These materials may be incorporated into naturally occuring clays, e.g., bentonite and kaolin, to improve the crush strength of the catalyst under commercial operating conditions. Such materials, e.g., clays or oxides, function as binders for the catalyst. It is desirable to provide a catalyst having good crush strength because in commercial use it is desirable to prevent the catalyst from breaking down into powder-like materials. These clay binders are normally employed for the purpose of improving the crush strength of the catalyst, and they can be employed to perform the same function in combination with the ZSM-22 zeolite.

Naturally occurring clays which can be composited with the new zeolite include the montmorillonite and kaoline family, which families include the subbentonites, and the kaolins commonly known as Dixie, McNamee-Georgia and Florida clays or others in which the main mineral constituent is halloysite, kaolinite, dickite, nacrite, or anauxite. Such clays can be used in the raw state as originally mined or initially subjected to calcination, acid treatment of chemical modification. Binders useful for compositing with the present crystal also include inorganic oxides, notably alumina.

In addition to the foregoing materials, the ZSM-22 zeolite can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The relative proportions of finely divided crystalline material and inorganic oxide gel matrix vary widely, with the crystal content ranging from about 1 to about 90 percent by weight.

In order to more fully illustrate the nature of the invention and the manner of practicing same, the following examples are presented.

In the examples which follow, and elsewhere in the specification, whenever adsorption data are set forth for comparison of sorptive capacities for water, cyclohexane and n-hexane, they were determined as follows:

A weighed sample of the calcined zeolite was contacted with the desired pure adsorbate vapor in an adsorption chamber, evacuated to 1 mm pressure and contacted with 12 mm Hg of water vapor or 20 mm Hg of n-hexane or cyclohexane vapor, pressures less than the vapor-liquid equilibrium pressure of the respective adsorbate at room temperature. The pressure was kept constant (within about ±0.5 mm) by addition of adsorbate vapor controlled by a manostat during the adsorption period, which did not exceed about 8 hours. As adsorbate was adsorbed by the new crystal, the decrease in pressure caused the manostat to open a valve which admitted more adsorbate vapor to the chamber to restore the pressures to the aforementioned control levels. Sorption was complete when the pressure change was not sufficient to activate the manostat. The increase in weight was calculated as the adsorption capacity of the sample in g/100 g of calcined adsorbent.

EXAMPLES 1-9

The crystallization of ZSM-22 was conducted, in Examples 1-9, in a stainless steel autoclave stirred at about 400 revolutions per minute (rpm) at 160° C. N-ethylpyridinium bromide was used as an organic template in all examples. The N-ethylpyridinium bromide was manufactured by the Eastman Kodak Company and was used as-received without further purification. In all examples, except for Example 1, conducted without a source of added alumina, aluminum sulfate $Al_2(SO_4)_3 \cdot 16H_2O$, was used as the alumina source. Reaction mixture compositions for each example, reaction time and product identification are set forth in Table IV. The zeolite products were identified by X-ray powder diffraction analysis. Product compositions, determined by chemical analysis for zeolites of some examples, are set forth in Table V.

TABLE IV

Crystallizations with Ethylpyridinium Cation

| Example | Silica Source | $\frac{SiO_2}{Al_2O_3}$ | $\frac{H_2O}{SiO_2}$ | $\frac{OH^-}{SiO_2}$ | $\frac{Na^+}{SiO_2}$ | $\frac{K^+}{SiO_2}$ | $\frac{R}{SiO_2}$ | Time on Stream (hours) | Product |
|---|---|---|---|---|---|---|---|---|---|
| 1 | Q-brand* | ∞ | 40 | 0.30 | 0.59 | — | 0.20 | 48 | 30% ZSM-22 + 70% ZSM-48 |
| 2 | Q-brand | 500 | ↓ | ↓ | ↓ | — | ↓ | 72 | 95% ZSM-22 + 5% ZSM-5 |
| 3 | Silica Sol** | 300 | ↓ | ↓ | 0.33 | — | ↓ | 72 | 100% ZSM-22 |
| 4 | Silica Sol | 200 | ↓ | ↓ | 0.34 | — | ↓ | 96 | 97% ZSM-22 + 3% ZSM-5 |
| 5 | Silica Sol | 90 | 20 | ↓ | — | 0.39 | ↓ | 48 | 100% ZSM-22 |
| 6 | Q-brand | ↓ | 40 | ↓ | 0.59 | — | ↓ | 48 | 100% ZSM-22 |
| 7 | Silica Sol | 60 | ↓ | ↓ | — | 0.43 | ↓ | 96 | 100% ZSM-22 |
| 8 | Silica Sol | ↓ | 20 | 0.15 | 0.28 | — | 0.10 | 72 | 100% ZSM-22 |
| 9 | Q-brand | ↓ | 40 | 0.30 | 0.59 | — | 0.20 | 72 | 100% ZSM-22 |

*Q-brand sodium silicate comprises about 28.5% by weight of $SiO_2$, 8.8% by weight of $Na_2O$ and 62.7% by weight of $H_2O$.
**Silica Sol comprises about 30% by weight of $SiO_2$ and about 70% by weight of $H_2O$.

TABLE V

Product Compositions of ZSM-22 Samples

| ZSM-22 Zeolite of Example | C (mole N ratio) | Formula per mole $Al_2O_3$ | | | Product Composition[a] | | |
|---|---|---|---|---|---|---|---|
| | | $N_2O$ | $Na_2O$ | $SiO_2$ | Al/uc | $Na^+$/uc | EtPYR/uc |
| 3 | 6.8 | 4.9 | 1.8 | 235 | 0.20 | 0.37 | 1.0 |
| 5 | 6.7 | 1.6 | n.a. | 88 | 0.53 | n.a. | 0.9 |
| 6 | 7.0 | 1.3 | 0.4 | 56 | 0.82 | 0.29 | 1.1 |
| 8 | 7.2 | 1.3 | 0.7 | 54 | 0.86 | 0.57 | 1.1 |
| 9 | 7.1 | 1.4 | 0.3 | 52 | 0.89 | 0.30 | 1.2 |

[a]"uc" is an abbreviation of "unit cell" which contains 24 ($SiO_2$ + $AlO_2^-$) tetrahedra.

The X-ray diffraction pattern of the as-synthesized ZSM-22 zeolites of Examples 3 and 7 is set forth below in Tables VI and VII, respectively.

The data for Tables VI and VII was obtained in the same manner as the data of Table I. Accordingly, the abbreviations and symbols of Tables VI and VII have the same meaning as set forth above in connection with the discussion of Table I.

TABLE VI

| 2 X Theta | d(Å) | $I/I_o$ |
|---|---|---|
| 4.46 | 19.79 | 2 |
| 8.17 | 10.81 | 75 |
| 8.34 | 10.59 | 1 |
| 10.15 | 8.71 | 19 |
| 12.82 | 6.90 | 27 |

TABLE VI-continued

| 2 X Theta | d(Å) | I/I₀ |
|---|---|---|
| 16.39 | 5.40 | 12 |
| 16.54 | 5.36 | 9 |
| 19.41 | 4.57 | 7 |
| 20.34 | 4.36 | 100 |
| 24.20 | 3.67 | 96 |
| 24.68 | 3.60 | 95 |
| 25.82 | 3.45 | 80 |
| 26.34 | 3.38 | 3 |
| 26.72 | 3.33 | 8 |
| 27.02 | 3.30 | 6 |
| 30.01 | 2.98 | 2 |
| 30.47 | 2.93 | 5 |
| 30.76 | 2.90 | 4 |
| 32.21 | 2.78 | 3 |
| 32.87 | 2.72 | 3 |
| 33.08 | 2.70 | 3 |
| 35.60 | 2.52 | 17 |
| 36.56 | 2.46 | 2 |
| 36.60 | 2.45 | 2 |
| 36.92 | 2.43 | 10 |
| 37.48 | 2.40 | 3 |
| 38.01 | 2.36 | 8 |

TABLE VII

| 2 X Theta | d(Å) | I/I₀ |
|---|---|---|
| 8.13 | 10.86 | 40 |
| 10.09 | 8.76 | 10 |
| 12.78 | 6.92 | 13 |
| 16.38 | 5.41 | 8 |
| 19.35 | 4.58 | 10 |
| 20.26 | 4.38 | 100 |
| 24.11 | 3.69 | 97 |
| 24.58 | 3.62 | 65 |
| 25.75 | 3.46 | 46 |
| 26.63 | 3.34 | 7 |
| 26.90 | 3.31 | 5 |
| 30.59 | 2.92 | 4 |
| 35.49 | 2.53 | 19 |
| 36.76 | 2.44 | 9 |
| 37.41 | 2.40 | 4 |
| 37.57 | 2.39 | 4 |
| 37.80 | 2.38 | 7 |

The data of Tables VI and VII was obtained in the same manner as the data of Table I. Similarly, the abbreviations in Table VI and VII have the same meaning as the abbreviations discussed above in connection with Table I.

It will be apparent to those skilled in the art that the specific embodiments discussed above can be successfully repeated with ingredients equivalent to those generically or specifically set forth above and under variable process conditions.

From the foregoing specification one skilled in the art can readily ascertain the essential features of this invention and without departing from the spirit and scope thereof can adopt it to various diverse applications.

What is claimed is:

1. A process for preparing a siliceous porous crystalline ZSM-22 zeolite material having the x-ray diffraction pattern of Table I, which comprises preparing a reaction mixture capable of forming said ZSM-22 zeolite material, said reaction mixture comprising sufficient sources of an alkali or alkaline earth metal, alumina, silica, RN and water, said sources having a composition, in terms of mole ratios, encompassed within the following ratios;

$SiO_2/Al_2O_3 = 20$ to $\infty$
$H_2O/SiO_2 = 10$ to $100$
$OH^-/SiO_2 = 0$ to $1.0$
$M^+/SiO_2 = 0$ to $2.0$
$RN/SiO_2 = 0.01$ to $2.0$ wherein RN is an N-ethylpyridinium cation and M is an alkali or alkaline earth metal, and maintaining the mixture at sufficient crystallization conditions until crystals of said zeolite are formed.

2. A process according to claim 1 wherein said ratios are as follows:

$SiO_2/Al_2O_3 = 30$ to $1000$
$H_2O/SiO_2 = 20$ to $60$
$OH^-/SiO_2 = 0.1$ to $0.4$
$M^+/SiO_2 = 0.1$ to $1.0$
$RN/SiO_2 = 0.05$ to $1.0$ wherein RN and M are the same as in claim 1.

3. A process according to claim 2 wherein M is selected from the group consisting of sodium, potassium or cesium.

4. A process according to claim 3 wherein M is sodium.

5. A process according to claim 1 wherein the mole $SiO_2/Al_2O_3 = 30$ to $1000$.

6. A process according to claim 5 wherein said source of RN is N-ethylpyridinium bromide.

7. A reaction mixture, which, upon crystallization under sufficient crystallization conditions, yields a synthetic crystalline aluminosilicate zeolite having the x-ray diffraction pattern of Table I, said reaction mixture comprising sufficient sources of an alkali or alkaline earth metal, alumina, silica, an N-ethylpryidinium cation and water, said sources having a composition, in terms of mole ratios, encompassed within the following ratios:

$SiO_2/Al_2O_3 = 20$ to $\infty$
$H_2O/SiO_2 = 10$ to $100$
$OH^-/SiO_2 = 0$ to $1.0$
$M^+/SiO_2 = 0$ to $2.0$
$RN/SiO_2 = 0.01$ to $2.0$ wherein RN is an N-ethylpyridinium cation and M is an alkali or alkaline earth metal.

8. A reaction mixture of claim 8 wherein M is sodium, potassium or cesium.

9. A process according to claim 1 wherein the crystalline zeolite material produced contains at least 95 percent by weight of said ZSM-22.

10. A process according to claim 1 wherein said ZSM-22 produced is essentially pure.

11. A process according to claim 1 wherein said ratio of $SiO_2/Al_2O_3$ is 500, said ratio of $H_2O/SiO_2$ is 40, said ratio of $OH^-/SiO_2$ is 0.30, M is Na, said ratio of $M^+/SiO_2$ is 0.59 and said ratio of $RN/SiO_2$ is 0.20.

12. A process according to claim 1 wherein said ratio of $SiO/Al_2O_3$ is 300, said ratio of $H_2O/SiO_2$ is 40, said ratio of $OH^+/SiO_2$ is 0.30, M is Na, said ratio of $M^-/SiO_2$ is 0.33 and said ratio of $RN/SiO_2$ is 0.20.

13. A process according to claim 1 wherein said ratio of $SiO_2/Al_2O_3$ is 200, said ratio of $H_2O/SiO_2$ is 40, said ratio of $OH^-/SiO_2$ is 0.30, M is Na, said ratio of $M^+/SiO_2$ is 0.34 and said ratio of $RN/SiO_2$ is 0.20.

14. A process according to claim 1 wherein said ratio of $SiO_2/Al_2O_3$ is 90, said ratio of $H_2O/SiO_2$ is 20, said ratio of $OH^-/SiO_2$ is 0.30, M is K, said ratio of $M^+/SiO_2$ is 0.39 and said ratio of $RN/SiO_2$ is 0.20.

15. A process according to claim 1 wherein said ratio of $SiO_2/Al_2O_3$ is 90, said ratio of $H_2O/SiO_2$ is 40, said ratio of $OH^-/SiO_2$ is 0.30, M is Na, said ratio of $M^+/SiO_2$ is 0.59 and said ratio of $RN/SiO_2$ is 0.20.

16. A process according to claim 1 wherein said ratio of $SiO_2/Al_2O_3$ is 60, said ratio of $H_2O/SiO_2$ is 40, said ratio of OH−/SiO$_2$ is 0.30, M is K, said ratio of M+/SiO$_2$ is 0.43 and said ratio of RN/SiO$_2$ is 0.20.

17. A process according to claim 1 wherein said ratio of SiO$_2$/Al$_2$O$_3$ is 60, said ratio of H$_2$O/SiO$_2$ is 20, said ratio of OH−/SiO$_2$ is 0.15, M is Na, said ratio of M+/SiO$_2$ is 0.28 and said ratio of RN/SiO$_2$ is 0.10.

18. A process according to claim 1 wherein said ratio of SiO$_2$/Al$_2$O$_3$ is 60, said ratio of H$_2$O/SiO$_2$ is 40, said ratio of OH−/SiO$_2$ is 0.30, M is Na, said ratio of M−/SiO$_2$ is 0.59 and said ratio of RN/SiO$_2$ is 0.20.

* * * * *